United States Patent [19]
Pierson

[11] 4,347,748
[45] Sep. 7, 1982

[54] TORQUE TRANSDUCER

[75] Inventor: James G. Pierson, Longueuil, Canada

[73] Assignee: Queen's University at Kingston, Kingston, Canada

[21] Appl. No.: 129,211

[22] Filed: Mar. 11, 1980

[30] Foreign Application Priority Data

Mar. 27, 1979 [CA] Canada ................................. 324262

[51] Int. Cl.³ ............................................. G01L 3/12
[52] U.S. Cl. ................................ 73/862.34; 73/862.28
[58] Field of Search ................ 73/136 A, 650, 862.34, 73/862.28

[56] References Cited

U.S. PATENT DOCUMENTS

| 3,309,920 | 3/1967 | Cuthbert | 73/136 A |
| 3,762,217 | 10/1973 | Hagen | 73/136 A |
| 3,897,766 | 8/1975 | Pratt, Jr. et al. | 73/136 A |
| 3,935,733 | 2/1976 | Schindler | 73/862.34 |

FOREIGN PATENT DOCUMENTS

| 242913 | 1/1912 | Fed. Rep. of Germany | 73/136 A |
| 946140 | 1/1964 | United Kingdom . | |
| 1008494 | 10/1965 | United Kingdom . | |
| 1091577 | 11/1967 | United Kingdom | 73/136 A |

Primary Examiner—Charles A. Ruehl
Attorney, Agent, or Firm—Stanley E. Johnson; Richard J. Hicks

[57] ABSTRACT

Apparatus for measuring torque (or functions derived therefrom or related thereto) transmitted by a shaft driven to rotate and connected to a load. The apparatus includes first and second optically flat, radiation reflecting, surfaces located on the shaft at respective first and second positions displaced from one another axially along the shaft and means for directing beams of radiation from a suitable source at the reflecting surfaces. There are first and second pick-up means spaced from the shaft and located to receive the radiation beams reflected by the respective first and second reflecting surfaces during rotation of the shaft and provide respective first and second outputs as a result of the radiation beams directed thereat by the reflecting surfaces. Signal processing circuit means associated with the first and second outputs provides an output interrelated with angular twist of the shaft at one of said first and second positions relative to the other. Direct reading of measurements obtained are readily provided and the energy radiation source means preferably a laser.

19 Claims, 23 Drawing Figures $\varphi = \dfrac{TL}{JG}$

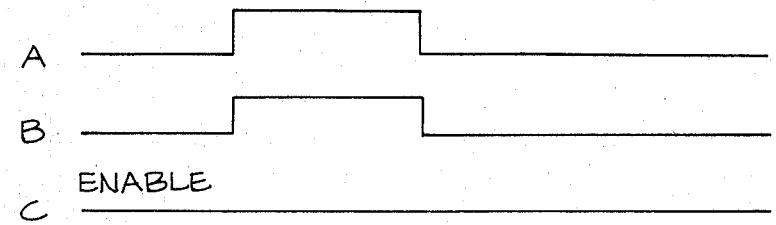
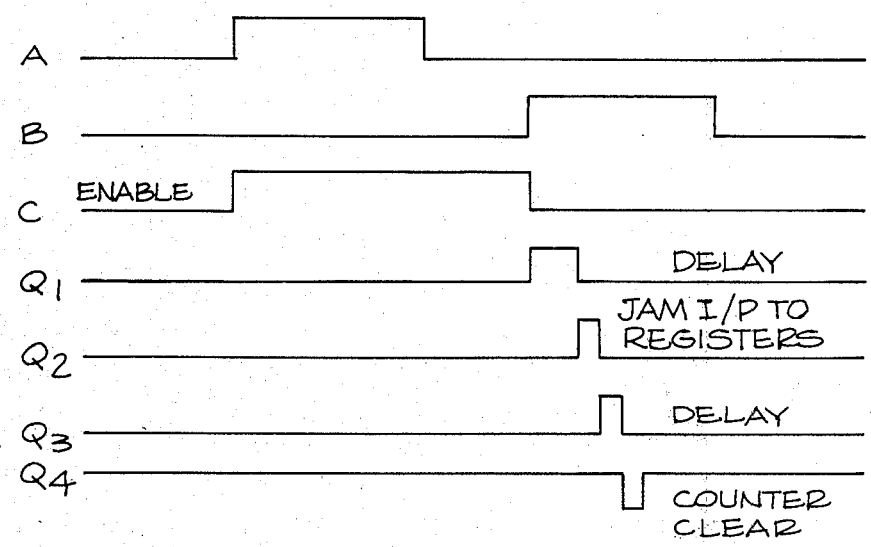

CHIPS

- A  INVERTERS
- B  D FLIP FLOPS
- C  COMPARATOR
- D  COMPARATOR
- E  COUNTER
- F  COUNTER
- G  INVERTERS
- H  ONE SHOT
- I  ONE SHOT
- J  ONE SHOT
- K  ONE SHOT
- L  REGISTER
- M  REGISTER

Fig 9

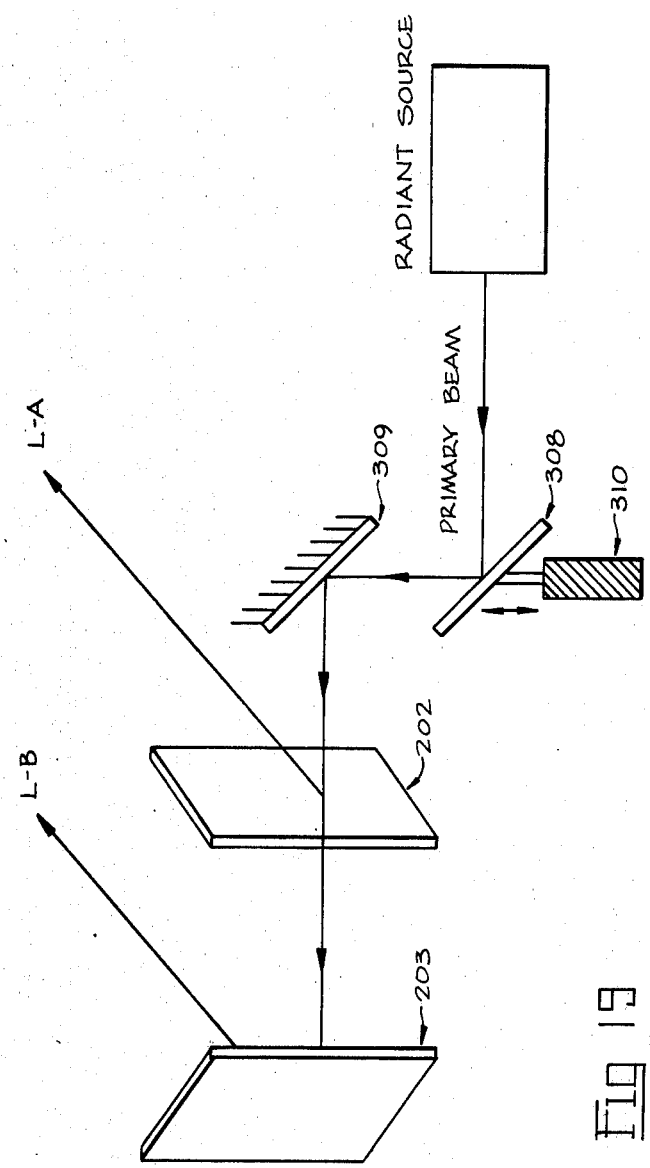

TORQUE TRANSDUCER

This invention relates generally to apparatus for determining torque transmitted (or other functions derived therefrom or related thereto) by a shaft driven to rotate and connected to a load without physical contact with the shaft or the application of additional load thereto.

Non-loading, non-contact torque-horsepower transducers are known and one such device, considered the most closely related to the present development, is disclosed in Canadian Pat. No. 962,475 which issued Feb. 11th, 1975 to the Massachusetts Institute of Technology. In this patent there is disclosed apparatus for noting positional changes of the shaft surface at one region relative to another as a result of torque related twist. The twist is converted to changes or modulations in light transmitted or reflected from a number of light reflecting surfaces spaced apart from one another circumferentially around the shaft at each of two locations spaced apart axially along the shaft. The reflecting surfaces are curved around the shaft following the circumference thereof and all such surfaces have precisely the same circumferential length and/or spacing between adjacent ones of such surfaces. The reflected light from the two locations provide signals that are processed by suitable circuitry to determine the amount of twist in the shaft between the two locations. The deflection of the shaft is a linear function of torque transmitted by the shaft and typically very small. Differential linear movements of the shaft surface of say, $10^{-4}$ inches or less must be detected to provide a useful apparatus. This, in the patented structure requires as noted above, precise circumferential length of the reflecting surfaces and/or precise circumferential spacing of the reflecting surfaces as well as complicated circuitry for processing the signals.

One object of the present invention is to provide a simple apparatus for measuring with accuracy relatively small deflections of shaft twist.

In accordance with one aspect of the present invention the apparatus is provided with reflecting surfaces comprising optically flat mirrored surfaces on the shaft. These provide extreme accuracy to the torque measurement apparatus with minimum cost. The size of the planar reflector surfaces is uninfluenced by shaft diameter and need only be large enough to reflect a beam of light from a light source. In the instant device the light source is a laser beam but other sources may be used as, for example, a collimated light source.

Another object of the present invention is to provide an accurate shaft torque measurement apparatus having a relatively simple and inexpensive signal processing means.

In accordance with another aspect of the present invention there is provided apparatus for measuring torque (or functions derived therefrom or related thereto) transmitted by a shaft driven to rotate and connected to a load comprising: (a) first and second optically flat, radiation reflecting, surfaces located on the shaft at respective first and second positions displaced from one another axially along the shaft, (b) means for directing beams of radiation from a suitable source, at the reflecting surfaces, (c) first and second pick-up means spaced from the shaft and located to receive the radiation beams reflected by the respective first and second reflecting surfaces during rotation of the shaft and provide respective first and second outputs as a result of the radiation beams directed thereat by the reflecting surfaces, and (d) signal processing circuit means associated with said first and second outputs providing an output interrelated with angular twist of the shaft at one of said first and second positions relative to the other.

The invention is illustrated by way of example with reference to the accompanying drawings, wherein:

FIG. 2b is a right-hand end view of FIG. 2a;

FIGS. 4a and 4b are schematics of over-all systems for indicating absolute torque and horse-power output;

FIGS. 8a and 8b illustrate timing for the circuitry respectively at no-load and load conditions;

FIG. 9 is a top view of chips utilized in the circuitry of a test apparatus embodying the present invention.

FIG. 19 illustrates an arrangement for providing a traceable calibration of the transducer, the arrangement providing means by which the system may be statically calibrated to deadweight torsional loading standards.

Figure 1:
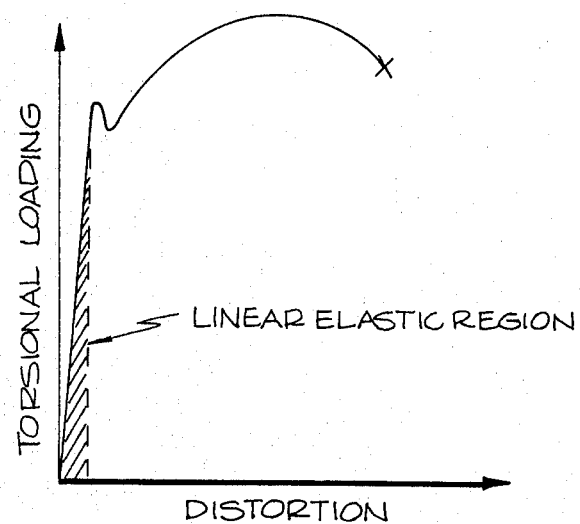
FIG. 1 is a graph illustrating distortion during torsional loading of a shaft.

The non-contact, non-loading, torque-horsepower transducer for rotating shafts of the present invention will hereinafter, for convenience of description, be simply referred to as the system. The system provides useable information derived from the material distortion of a rotating shaft. When a shaft is torsionally loaded it deflects angularly along the length of the shaft and the total deflection measured is dictated by the polar moment of inertia (a shape factor), Young's modulus in torsion, and the torque applied to the shaft. The relationship is graphically illustrated in FIG. 1. Young's modulus in torsion is the slope of the curve and is, as shown, linear within the linear elastic range of shaft distortion between zero torsional load and the upper yield point of the shaft.

In accordance with the present invention, two relatively small optically flat reflecting surfaces are located on the shaft and at positions displaced from one another axially along the shaft. Two laser beams (from a suitable source) are directed towards the reflecting surfaces. For each revolution of the shaft the laser beams are reflected by respective ones of the reflecting surfaces (mirrors) onto respective ones of two photo-detecting sensors such as photo-resistors, photo-transistors, photo-voltaic cells and photo-diodes. Under no-load conditions the outputs of the photo-detecting sensors register no phase displacement if the mirrors are collinear and coplanar. If the mirrors are not perfectly aligned there will be a fixed initial phase displacement. As the shaft load increases the material of the shaft deforms angularly, the deflection being, as mentioned above, a linear function of shaft sample length, Young's modulus in torsion, polar moment of inertia and the torque being transmitted through the shaft. As the shaft deflection increases more and more an additional displacement is introduced and as the phase displacement increases, the time between outputs from the photodiodes also increases. Signals derived from this, and suitably processed, provide information as to relative torque, real torque, horsepower or other functions derived therefrom or related thereto as may be desired.

Referring to FIGS. 2 to 5, two optically flat reflecting surfaces, designated respectively A, B are located on a shaft at respective first and second positions spaced apart from one another axially along the shaft at a spacing designated L. These reflecting surfaces may be mirrors secured to the shaft or polished flats on the shaft or flats on the shaft with a mirrored finish. It is intended herein that these various different reflecting surfaces fall within the term mirrors. Two laser beams designated respectively L-A and L-B (from a suitable source) are directed at the shaft so as to be reflected by the respective mirrors A and B onto suitable pickup means. The pickup means are two photodetectors (preferably photo-diodes) designated respectively 10A and 10B. Assuming zero displacement under no load conditions, as the shaft is loaded torsionally, the mirrors become displaced from each other an amount designated dS in FIG. 2 due to twisting of the shaft. The photodetectors 10A and 10B, as a result of the shaft twist, are illuminated at two different times. The phase delay between the two photodetector outputs indicates the physical distortion of the shaft between the mirrors in real time. The system does not substract energy from the shaft to measure its torsional load and the shaft need not be physically altered to accommodate the system. In tests conducted the system has been found to be very satisfactory and accurate. This results from using optically flat reflecting surfaces which provide short pulse durations. The pulse duration can be increased or decreased by varying the distance of the pickups from the shaft on which the mirrors are located. A distance of one inch (i.e. spacing between the shaft and the photodetectors) has been found satisfactory.

Figure 2A:
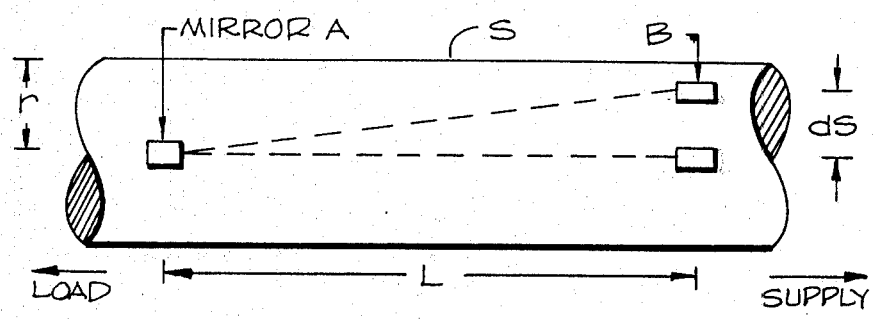
FIG. 2a is an elevational view of a shaft with mirrors attached thereto and displaced from one another by torsionally loading the shaft.
Figure 2B:
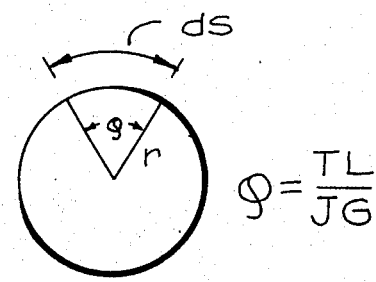

Referring to FIGS. 2A and 2B the angular twist designated $\phi$ may be expressed as $\phi=(TL/JG)$ where T is torque in inch/lbs., L is the spacing of the mirrors axially along the shaft in inches, J is the polar moment of inertia of the shaft which is equal to $(\pi r^4/2$ in.$^4$ where r is the shaft radius in inches and G is Young's modulus in torsion, $ds=r\phi$. In knowing the torque transmitted by a shaft one can readily determine the horsepower which is equal to $(2NT\pi)/33,000$ where N is the RPM, of the shaft and T equals torque in ft./lbs.

Figure 3:
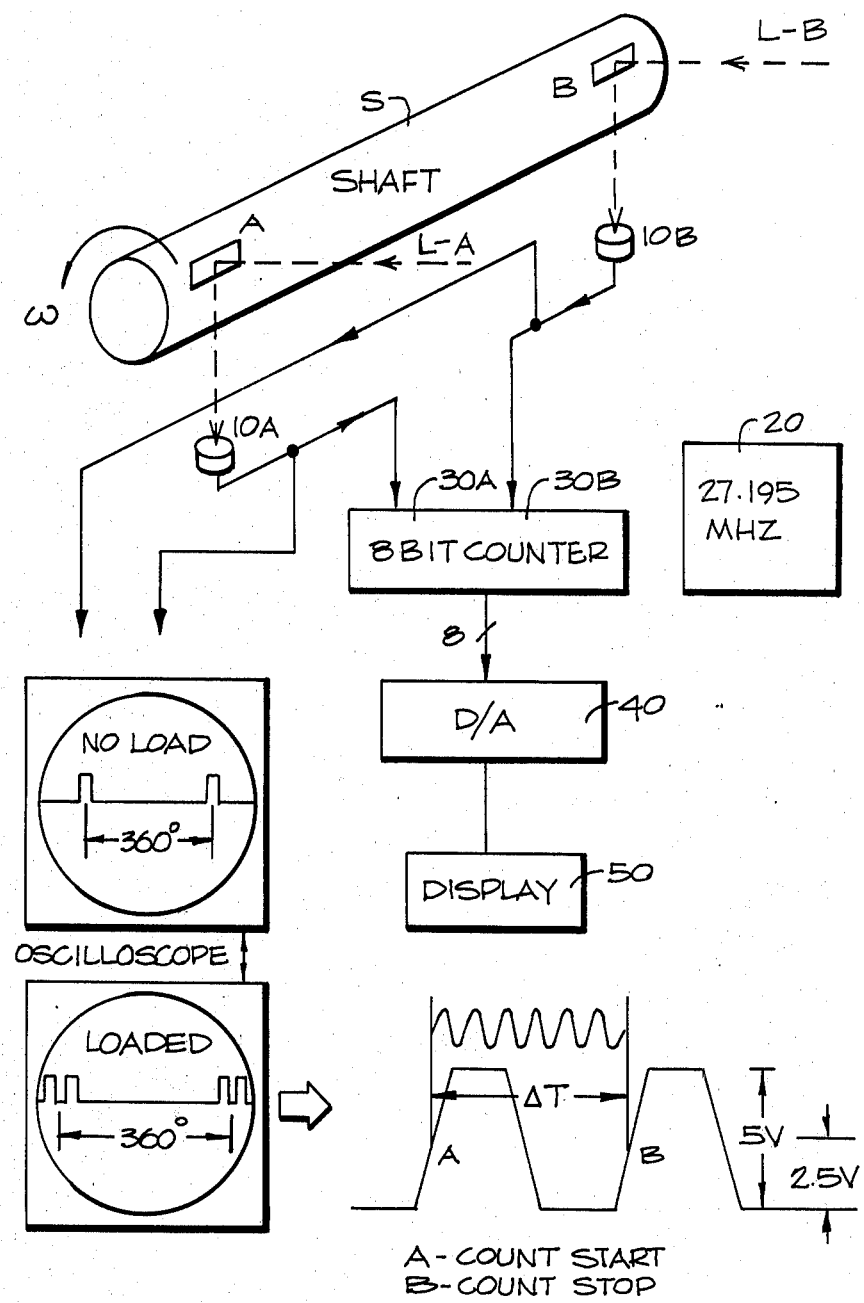
FIG. 3 is a schematic block diagram of an over-all system for indicating relative torque in a shaft.
Figure 7A:
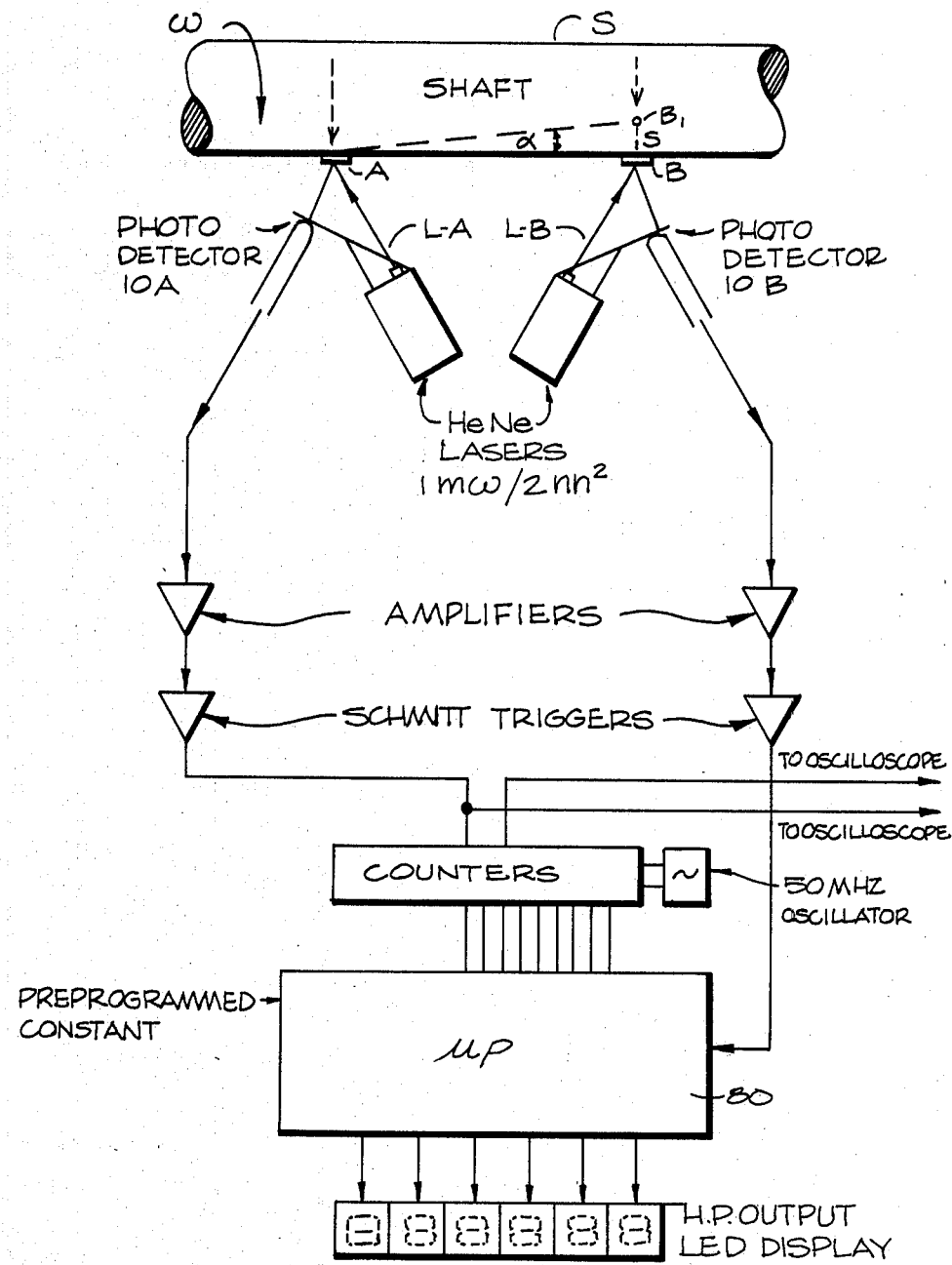
FIG. 7 is a detailed schematic of the detector and comparator circuits shown in block in FIG. 5.

The torque transmitted by the shaft is sampled every 360° of shaft rotation which provides a sampling rate of 30 samples per sec. at 1,800 RPM. A 27.195 MHz reference oscillator, 20, is shown in FIG. 3 associated with counters 30A and 30B. The counters are clocked by the oscillator and thus the 27.195 MHz oscillator forms the time reference for determining the real time between photodetector outputs, due to torsional loading. The signal from the counters 30A and 30B pass to a D/A (digital to analog) converter 40 and the result displayed at an indicator 50. The results, if desired, can be fed to a computer 80 (see FIG. 4A) which has preprogrammed constants to give a direct H.P. reading on a display 50A.

Figure 4B:
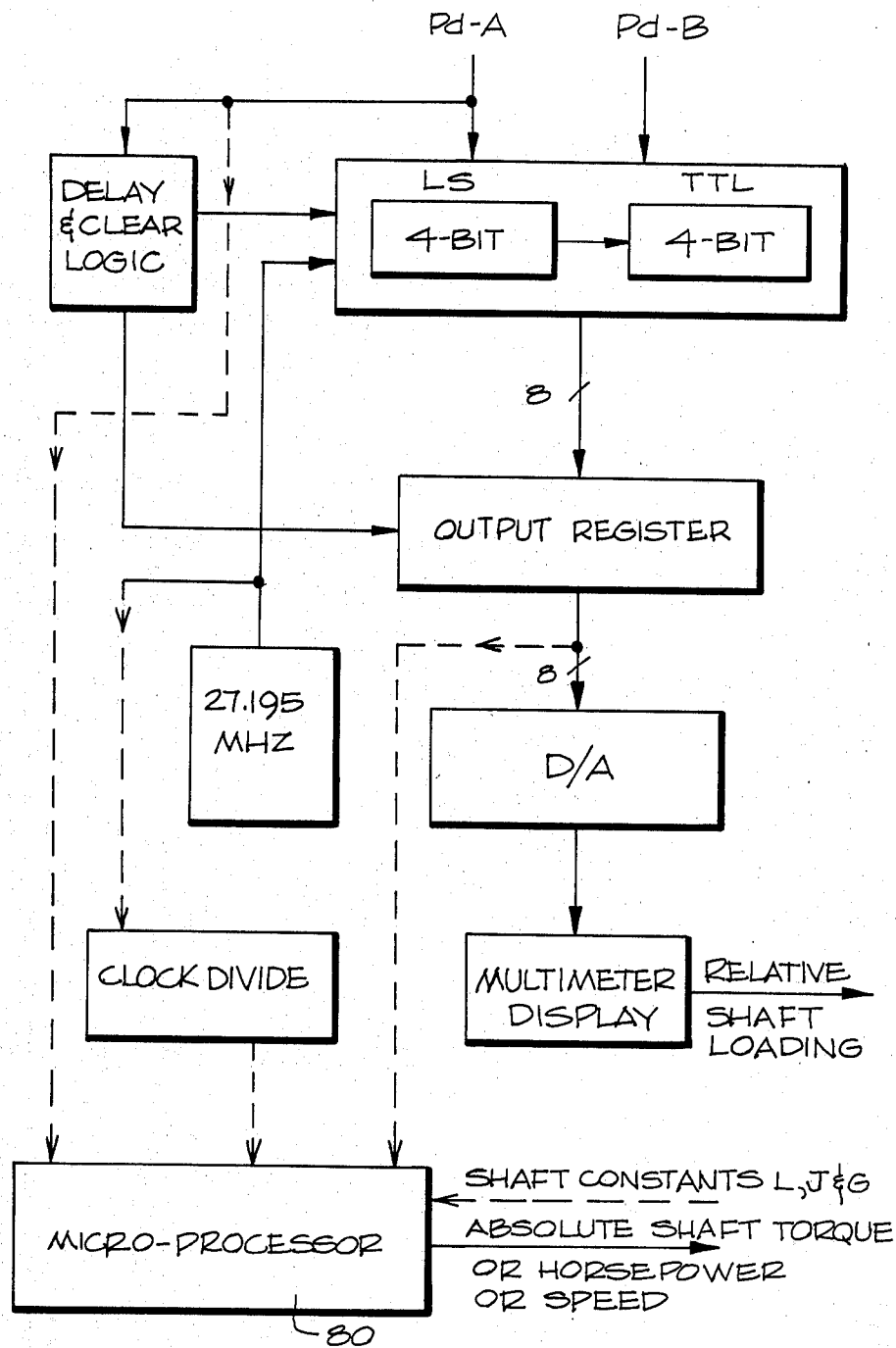

There are two possible modes of operation, one being a shaft deflection detector (FIG. 3) and hence a torque transducer (relative) and the other an absolute torque or H.P. measurement device (FIGS. 4A and 4B).

The first system measures the shaft deflection and hence is a relative torque transducer. By using a lower frequency clock and the output from one of the photodetectors one can determine shaft speed. The second method utilizes the formula $\phi=(TL/JG)$ and a hardware multiplier circuit (or microprocessing unit) to generate an absolute torque and horsepower output. The hardware multiplier circuit is preprogrammed with shaft constants L, J and G. The second system is illustrated in FIG. 4A and 4B. Both systems require that the shaft twist be measured accurately with the amount of twist being as small as $10^{-4}$ inches or even less.

Figure 5:
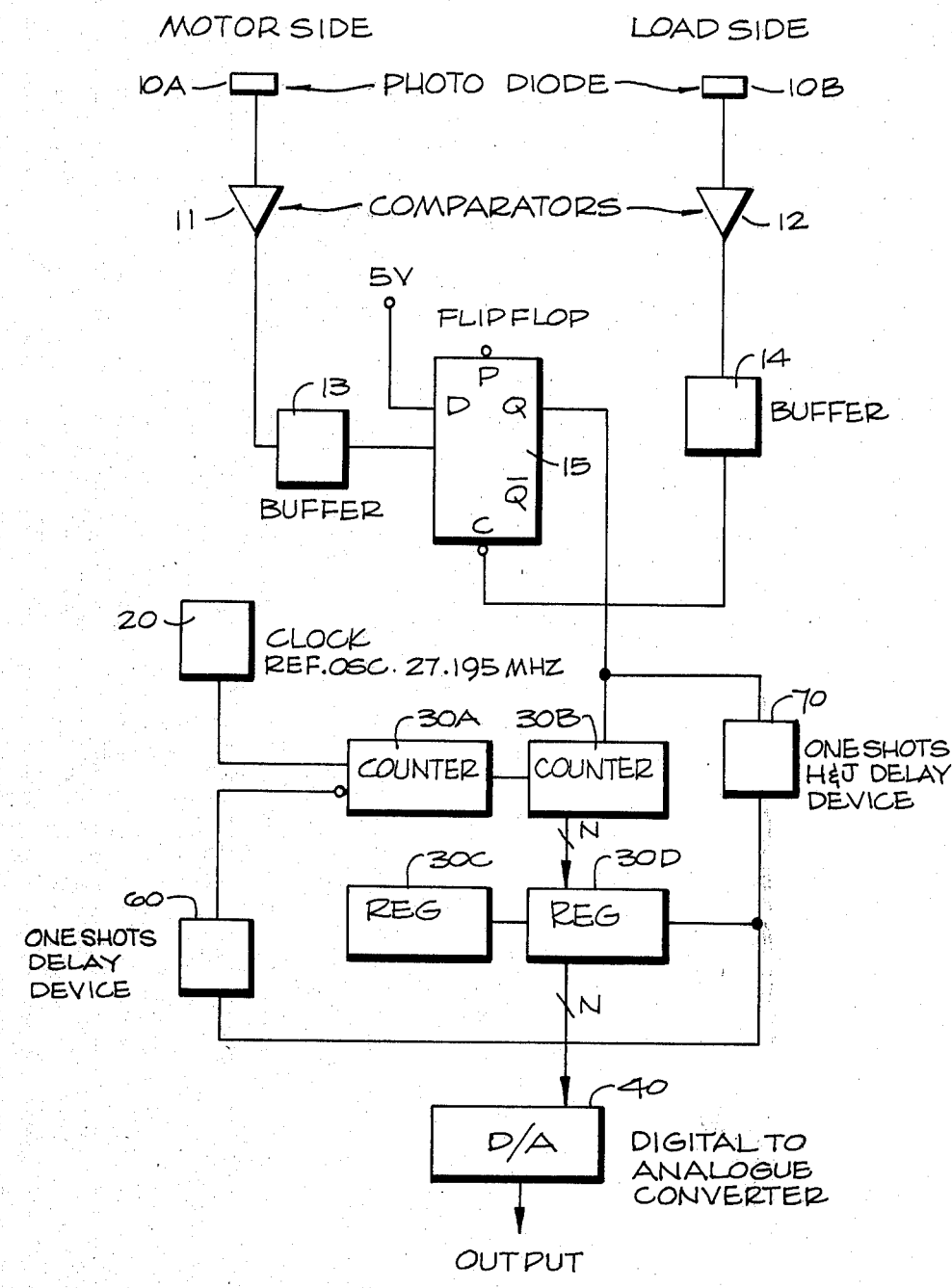
FIG. 5 is a schematic circuit of a prototype system of FIG. 3 as constructed and operated in tests.

As previously mentioned, two laser beams are reflected from the rotating shaft. At no-load an adjustment renders the two pulses coincident and the circuit passive. As load is added, the two pulses are presented to the circuit slightly out of phase and it is this real time difference that is processed. Knowing the real time (difference between detector outputs) and the shaft surface speed, the deflection of the mirrors is determined. The signal processing of system one is illustrated in FIG. 5. The pulses from respective photodiodes 10A and 10B are first passed through respective comparators 11 and 12 which gives a good edge to the signals and also makes them level compatible to the rest of the circuit. The signals are then passed through buffers 13 and 14 to make them compatible to the inputs of a Flip Flop 15. In the no load condition (assuming proper adjustments) the two pulses are coincident and the rest of the circuit does not operate. The Flip Flop 15 is cleared by the pulses from photodetector 10B and hence no signal is presented to the rest of the circuit at the no load condition. The pulses from the two detectors arrive at the Flip Flop 15 simultaneously, the clear input overrides the clock input. As load is introduced onto the shaft, detector 10A will clock the D (high) input onto Q of Flip Flop 15 before the pulse from detector 10B clears the Flip Flop 15. The time that the Q output is active represents the phase displacement and real time difference between the detector signals and, due to the fact that the system is run at constant speed, is also directly proportional to the torque.

This time is accurately recorded by two cascaded counters 30A, 30B that count with the 27.195 MHz crystal controlled clock 20. When the count is finished, that is the Flip Flop 15 is cleared, the contents of the counters are dispensed to two registers 30C and 30D. These registers hold the resultant count and the contents are fed to the D/A (Digital to Analogue) converter 40 (or to a computer) and the output displayed on a D.C. voltmeter 50 or some other suitable display and/or recording apparatus. The rest of the circuit is simply delay and clear logic to zero the system for another duty cycle.

Circuit Design

Figure 6:
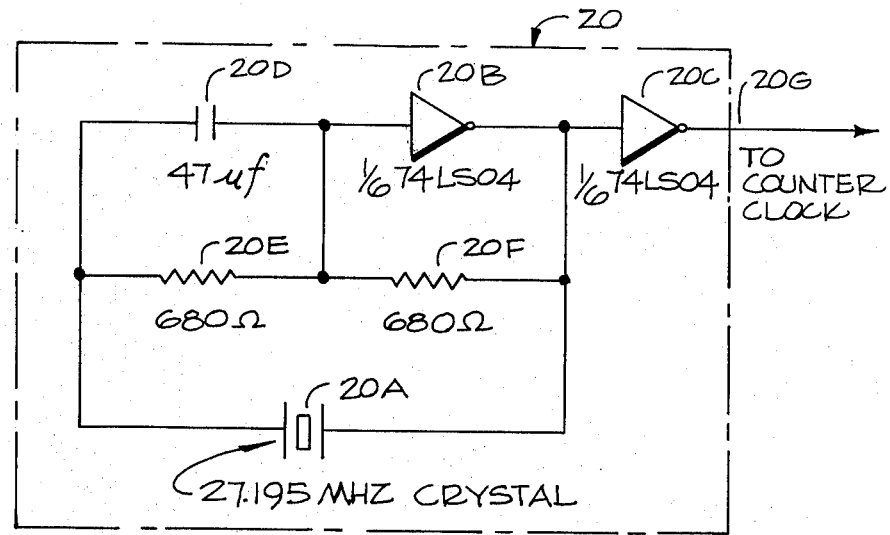
FIG. 6 is a detailed schematic for the reference clock component shown in FIG. 5.

The circuit for the reference clock or oscillator 20 is shown in FIG. 6 from which it will be noted it is controlled by a 27.195 MHz crystal 20A for very accurate frequency control. Typical drift for these crystals is 0.01% which normally is not enough to affect the accuracy of the output significantly. In the circuit there are two Low Power Shottky TTL (Transistor Transistor Logic) inverters 20B and 20C, one for the oscillator and one for an output buffer. The circuit is close in design to a fairly standard TTL oscillator but has a 47 pF silver mica capacitor 20D to block the fundamental component response and force the crystal to oscillate at its third harmonic of 27.195 MHz. Two 680Ω resistors 20E and 20F, in series, are connected across the 27.195 crystal and each connected between the capacitor 20D and inverter 20B. The output from inverter 20C is connected to counters 30A and 30B by line 20G.

Figure 7:
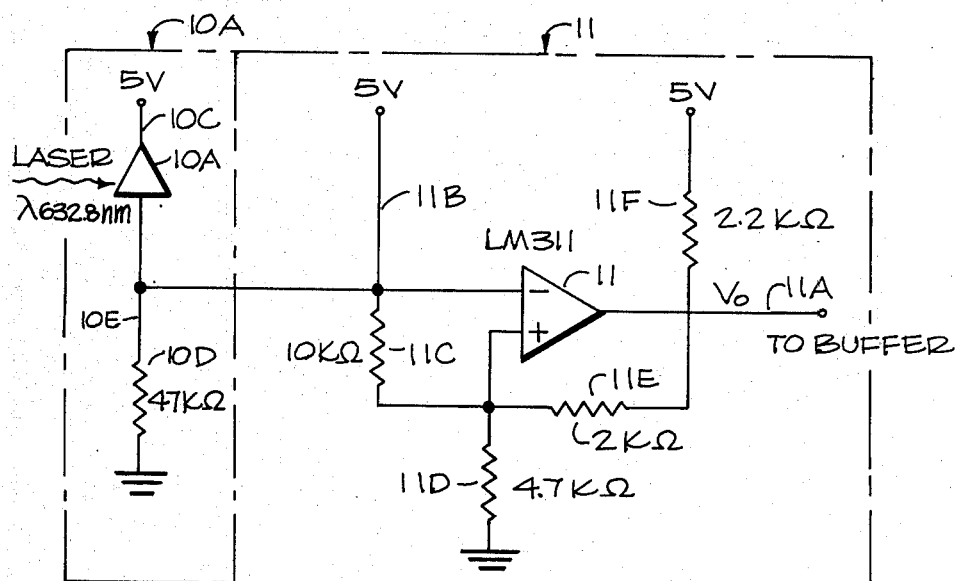

The photo detectors 10A and 10B and respective comparators 11 and 12 have identical circuitry and thus for convenience only one will be described. Referring to FIG. 7, photo detector 10A has a 5 volt bias applied thereto through line 10C and grounded through a 47KΩ resistor 10D by line 10E. Line 10E is connected to the inverting input of comparactor 11 whose output Vo is applied to buffer 13 through line 11A. A 5 V bias is applied to comparator 11 by line 11B through a 10KΩ resistor 11C, grounded through a 4.7KΩ resistor 11d, and also connected to line 11A through a 2KΩ resistor 11E. Line 11A has a 5 V D.C. applied thereto through a 2.2KΩ resistor 11F.

The photo detectors 10A and 10B in this example are Monsanto MD2 photo diodes which have a dark current of approximately 2.5 uA and when illuminated by the laser light, the reverse current increases to approximately 100 uA. This current through the 47K resistor 10D gives nearly $5^v$ as the input to the comparator associated therewith. The comparator is an LM311 from Signetics and simply compares the inputs and switches the output when reference voltage level is crossed. The 2.2K resistor 11F to Vcc give TTL level output. The 2K resistor 11E and the 4.7K resistor 11D provide some hysteresis for the circuit. The positive input is at a voltage given by:

$$V_+ = \frac{4.7}{4.7 + 2} V_o$$

Therefore, when the output is at 5 Volts, $V_+$ is at 3.5 Volts. When $V_o$ is at zero $V_+$ is at zero unless the 10K resistor 11C is present. Since the input signal is never less than zero volts the bottom reference voltage must be raised to some positive voltage. When $V_o$ is zero Volts the voltage at $V_+$ is given by:

$$V_+ = \frac{(2//4.7)}{10 + (2//4.7)} V_{cc}$$

Therefore, the bottom reference voltage is raised from zero to almost 0.7 Volts.

The hysteresis is introduced because of noise problems which otherwise can cause the circuit to fire more than once due to the passing of a laser beam. The hysteresis avoids the multiple firing problem and a clean output is presented to the buffers for utilization.

Delay devices 60 and 70 are connected as shown in FIG. 5 and each consist of two one shots which are Signetics monostable multivibrators 74121. Internal timing resistors are used and external timing capacitors are added to increase pulse width as needed. One-shots H, I of respective delay devices 70 and 60 and one-shot J of delay device 70 have 120 pF silver mica timing capacitors and one-shot J has a 0.01 uF disc capacitor. If the timing diagrams of FIG. 8A and 8B are examined it is easy to determine the effect of these timing circuits. In these figures the lines A and B are pulses from respective photodiodes 10A and 10B and line C is the enable pulse to the counters. When the pulse is high the counters count. Lines Q1 and Q3 are the outputs of monostables J and H of delay device 70 and Q2 and Q4 the outputs of monostables I and K of delay device 60.

The counters 30A and 30B are Signetics respectively 74161 and 74LS161. They are cascaded synchronously, that is the two counters are simultaneously clocked but the second counter (30A) only counts when enabled by the carry out of the first counter 30B. The first counter 30B is enabled by the Q output of the Flip Flop 15 and only counts when Q is high. The outputs of the counters are fed to the D inputs on two Signetics 7475 quad latches of the registers 30C and 30D which store the number for use by the D/A converter 40. The contents of the latches are changed every revolution of the shaft as the count changes.

The major components of the circuit have been examined and a more detailed study of the signal processing follows.

Detailed Signal Processing

Understanding of the following description will be aided by reference to FIG. 5.

As the laser beams sweep past the photodiodes a 5 Volt pulse will appear at the input to the comparators. Due to the fact that the comparators are used in the inverting mode (See FIG. 7) the output pulse will be exactly inverted with respect to the input. That is, the voltage $V_o$ will be high at all times unless the photodiodes have been activated at which time it goes low for the duration of the diode pulse. The pulse from photodiode 10A, i.e. drive end of the shaft, is passed through the inverter buffer 13 to make it compatible to the rising edge sensitive clock input on the D input of Flip Flop 15. The D input on the Flip Flop is held high at all times. The pulse of photodiode 10B; i.e. load end of the shaft, passes through two inverter buffers 14 to make it compatible with the active low input C of the Flip Flop 15.

At no-load the two pulses are made coincident, by adjusting the lasers or photodetector positions and so the Flip Flop is clocked and cleared simultaneously, leaving the Q output low at all times. Since the Q output activates the rest of the circuit at no-load the circuit is passive.

As the load is added, the shaft begins to twist and the motor side diode 10A pulse reaches the Flip Flop first and clocks a high through to Q. After the load side is activated, say T microseconds later, the Flip Flop is cleared and Q goes low. The time T that the Q output is high is directly proportional to the twist of the shaft.

The high pulse, Q, from the Flip Flop performs two functions. First, it presents an enable pulse to the two counters 30A and 30B. All the time that Q is high the two counters count with the 27.195 MHz clock. When the counters are inhibited, Q going low, the number in the counters is directly proportional to the torque.

The falling edge of Q is also used for jamming the contents of the counters into registers for use by the D/A and also for zeroing the counters for another cycle.

The first one-shot J (See FIG. 8B) is activated by the falling edge of Q. This pulse is used as a pure delay, giving the contents of the counters time to settle after being inhibited. The falling edge of Q1, the output of the first one-shot, is used to fire the second one-shot (K) whose output, Q2, is used as the clock input to the latches to transfer the contents of the counters into the registers. The falling edge of Q2 is also used to fire another one-shot (H) that provides another pure delay which allows the contents of the registers to settle after the transfer. The falling edge of Q3 is used to fire another monostable (I) whose output, Q4, is used to clear the counters and therefore zero the system.

The output of the registers is fed to the D/A converter whose output is displayed by a D.C. voltmeter, i.e. display 50 in FIG. 3. The output to the voltmeter is then directly proportional to the torque in the shaft and is then a relative torque measurement. Absolute torque and/or horsepower and/or speed is obtained in the system of FIGS. 4A and 4B where the information is provided to a microprocessor preprogrammed with shaft constants L, J and G.

FIG. 9 illustrates a physical layout of chips A to M used in the circuit of FIG. 5 of an actual test unit and is co-related therewith by the same reference as used in FIG. 5. In FIG. 9 chips A to M are as follows:

| FIG. 5 References | | Signetics Designation |
|---|---|---|
| 13- | A - Inverters | 7404 |
| 15- | B - D Flip Flop | 74L574 |
| 11- | C - Comparator | LM311 |
| 12- | D - Comparator | LM311 |
| 30B- | E - Counter | 74LS161 |
| 30A- | F - Counter | 74161 |
| 20- | G - Inverters | 74LS04 |
| 70- | H - One shot | 74121 |
| 60- | I - One shot | 74121 |
| 70- | J - One shot | 74121 |
| 60- | K - One shot | 74121 |
| 30C- | L - Register | 7475 |
| 30D- | M - Register | 7475 |

These chips when connected as per the following table will provide an operative device having the circuitry of FIG. 5.

| PIN CONNECTIONS | | | | | |
|---|---|---|---|---|---|
| Chip | Pin | Destination | Chip | Pin | Destination |
| A | 1 | D7 | C | 1 | Gnd |
|  | 2 | A3 |  | 2 | Bias Point |
|  | 4 | B3 |  | 3 | I/P from Photo Diode |
|  | 5 | C7 |  | 4 | −15$^V$ |
|  | 6 | B1 |  | 5 | NC |
|  | 7 | Gnd |  | 6 | NC |
|  | 8 | NC |  | 8 | +15$^V$ |
|  | 9 | NC | D | 1 | Gnd |
|  | 10 | NC |  | 2 | Bias Point |
|  | 11 | NC |  | 3 | I/P from Photo Diode |
|  | 12 | NC |  | 4 | −15$^V$ |
|  | 13 | NC |  | 5 | NC |
|  | 14 | Vcc |  | 6 | NC |
| B | 2 | +5$^V$ |  | 8 | +15$^V$ |
|  | 4 | +5$^V$ | E | 1 | F1 |
|  | 5 | E7, J3 |  | 2 | G6 |
|  | 6 | NC |  | 3 | NC |
|  | 7 | Gnd |  | 4 | NC |
|  | 8 | NC |  | 5 | NC |
|  | 9 | NC |  | 6 | NC |
|  | 10 | NC |  | 8 | Gnd |
|  | 11 | NC |  | 9 | +5$^V$ |
|  | 12 | NC |  | 10 | E7 |
|  | 13 | NC |  | 11 | M7 |
|  | 14 | Vcc, +5$^V$ |  | 12 | M6 |
| E | 13 | M3 | G | 11 | NC |
|  | 14 | M2 |  | 12 | NC |
|  | 15 | F7 |  | 13 | NC |
|  | 16 | +5$^V$ |  | 14 | +5$^V$ |
| F | 1 | I1 | H | 1 | NC |
|  | 2 | G6 |  | 2 | NC |
|  | 3 | NC |  | 3 | +5$^V$ |
|  | 4 | NC |  | 4 | +5$^V$ |
|  | 5 | NC |  | 5 | K6 |
|  | 6 | NC |  | 6 | I3 |
|  | 8 | Gnd |  | 7 | Gnd |
|  | 9 | +5$^V$ |  | 8 | NC |
|  | 10 | F7 |  | 9 | +5$^V$ |
|  | 11 | L7 |  | 10 | Cext |
|  | 12 | L6 |  | 11 | Cext |
|  | 13 | L3 |  | 12 | NC |
|  | 14 | L2 |  | 13 | NC |
|  | 15 | NC |  | 14 | +5$^V$ |
|  | 16 | +5$^V$ |  | 2 | NC |
| G | 1 | NC |  | 4 | +5$^V$ |
|  | 2 | NC |  | 5 | +5$^V$ |
|  | 3 | 47pF Cap and Bias Point |  | 6 | NC |
|  | 4 | G5, resistor |  | 7 | Gnd |
|  | 5 | Crystal |  | 8 | NC |
|  | 7 | Gnd |  | 9 | +5$^V$ |
|  | 8 | NC |  | 10 | Cest |
|  | 9 | NC |  | 11 | Cext |
|  | 10 | NC |  | 12 | NC |
| I | 13 | NC | L | 1 | NC |
|  | 14 | +5$^V$ |  | 4 | K6 |
| J | 1 | NC |  | 5 | +5$^V$ |
|  | 2 | NC |  | 8 | NC |
|  | 4 | +5$^V$ |  | 9 | D/A |
|  | 5 | +5$^V$ |  | 10 | D/A |
|  | 6 | K3 |  | 11 | NC |
|  | 7 | Gnd |  | 12 | Gnd |
|  | 8 | NC |  | 13 | L4 |
|  | 9 | +5$^V$ |  | 14 | NC |
|  | 10 | Cext |  | 15 | D/A |
|  | 11 | Cext |  | 16 | D/A |
|  | 12 | NC | M | 1 | NC |
|  | 13 | NC |  | 4 | L13 |
|  | 14 | +5$^V$ |  | 5 | +5$^V$ |
| K | 1 | NC |  | 8 | NC |
|  | 2 | NC |  | 9 | D/A |
|  | 4 | +5$^V$ |  | 10 | D/A |
|  | 5 | +5$^V$ |  | 11 | NC |
|  | 7 | Gnd |  | 12 | Gnd |
|  | 8 | NC |  | 13 | M4 |
|  | 9 | +5$^V$ |  | 14 | NC |
|  | 10 | Cext |  | 15 | D/A |
|  | 11 | Cext |  | 16 | D/A |
|  | 12 | NC |  |  |  |
|  | 13 | NC |  |  |  |
|  | 14 | +5$^V$ |  |  |  |

Figure 10:
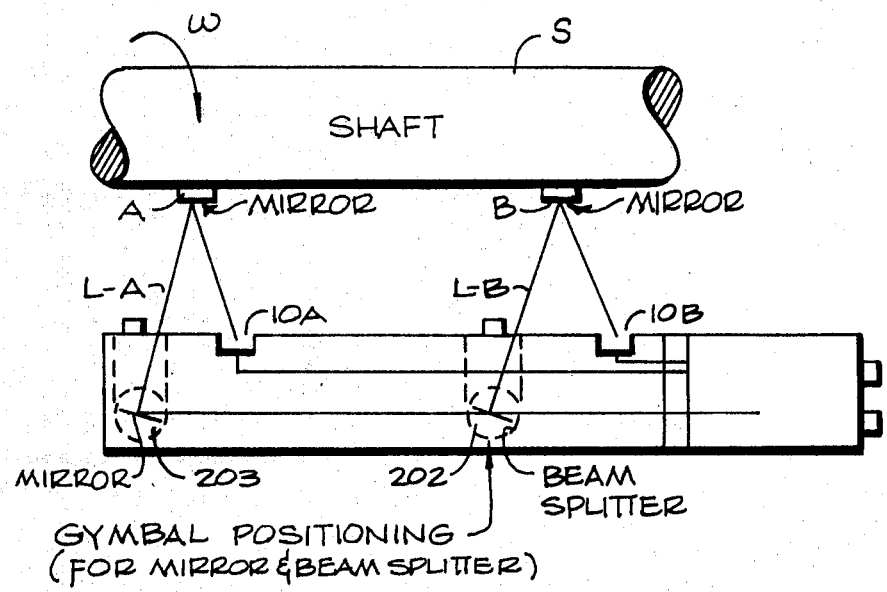
FIG. 10 is a front elevational view of one design of the system having practical applications.
Figure 11:
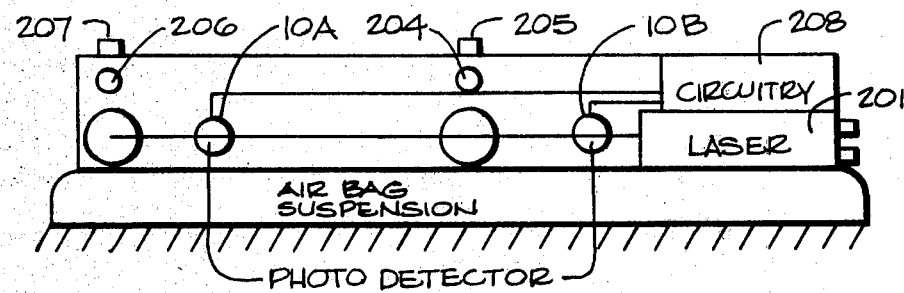
FIG. 11 is a top plan of FIG. 10 but omitting the shaft.
Figure 12:
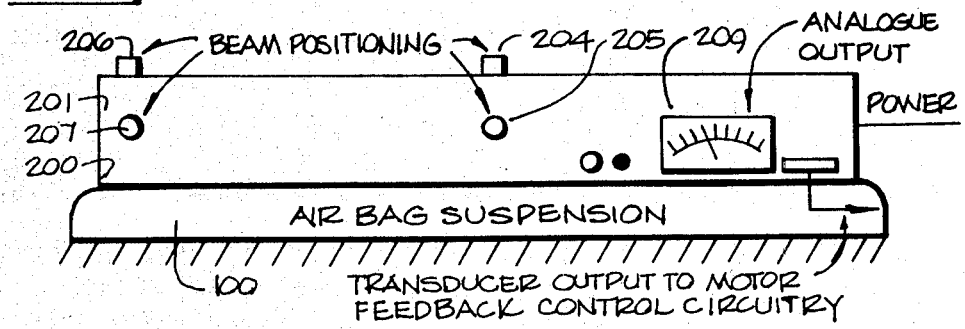
FIG. 12 is a rear elevational view of FIG. 10.

A practical design of the system for commercial applications, is illustrated in FIGS. 10, 11 and 12. In these figures there is illustrated an air bag cushion support 100 (or other suitable means to provide a large dynamic dampening coefficient) on which the torque measuring apparatus 200 rests and is supported thereby near a shaft S of which the torque transmitted thereby is to be measured. The shaft S has optically flat mirrors A and B thereon spaced apart from one another axially along the shaft at a spacing of L inches. The mirrors may be separate elements affixed to the shaft or alternatively small flats on the shaft surface which have a mirrored finish or mirror surface applied thereto. The reflecting surface is preferably flush with the shaft surface for obvious reasons having regard to the formula for torque and H.P. calculations but if not compensating factors can be introduced to provide a direct and true H.P. or torque reading as the output of the display and/or recorder device.

The apparatus 200 includes a casing having a laser beam source 201 mounted therein and suitably aligned with a beam splitter and beam reflector 202 and a beam reflector 203 to direct respective laser beams L-B and L-A onto mirrors B and A. The reflector and beam splitter 202 and mirror 203 have gymbal mountings (not shown) for suitably positioning and aligning the laser beams relative to the position of mirrors A and B and location of photo detectors 10A and 10B. The gymbal mounting of beam splitter 202 is positionally adjustable by finger movable knobs 204 and 205 and mirror 203 by knobs 206 and 207. The circuitry of FIG. 10 (or FIG. 4B as the case may be) is located in the casing at a position designated 208 in FIG. 11. A direct reading scale 209, mounted on the casing, displays information as to torque, HP and/or RPM as the case may be.

Advantages of the Present System

1. The System is non-loading.
2. The resolution of the System is limited by the clock frequency.
3. The shaft need not be physically altered.
4. By utilizing fast photo detectors, the sensors may be removed from the immediate vicinity of the shaft and adequately resolve the real time displacment between detector outputs.
5. Soft or hardcopy outputs are possible.
6. Relative or absolute torque may be obtained from the System.
7. The positioning of the laser(s) is very flexible as all offsets may be easily compensated for by altering the angle of incidence of the laser beams, and/or positioning of the detectors.
8. The System duty cycle is limited by the lasing element's mean time to failure of ten thousand hours.
9. The System sampling frequency is a function of the number of mirrors installed around a circumference of the shaft and the shaft speed.
10. Changing shaft diameters between sensing points may be compensated for.
11. The lasers and detectors may be positioned along the shaft so that the System may be oriented as it was constructed or the beams may be incident along the axis of the shaft.
12. The System is lightweight.
13. The System consumes less than 50 watts of electrical power.
14. The size of the shaft to be monitored is irrelevant to the operation of the System.
15. The System is very adaptable to Motor Feedback Control Network.
16. The System is easily isolated from extraneous oscillations present in an industrial environment.
17. The System requires minimal maintenance, dust and airborne dirt may settle on the mirrors, however, greater than fifty percent attenuation of the incident laser beams will still provide adequate optical energy inputs to the detectors provided the detectors are positioned such that the attenuation due to dust and dirt are compensated for by slower detector scan rates.

The ability to detect power being transmitted through a shaft between a power supply and a load is of paramount importance in devising prime mover control and protection schemes.

An electro-optical deflection detector has been described which has no physical contact with the observed shaft and which requires minimal shaft modification. The transducer will derive the torque being transmitted by the machine member through the predictability of elastic material deformation by directly measuring the deflection (ds) and rotational speed ($\omega_s$) of the machine member, secondary quantities such as torque ($\tau$) and horsepower (p) will be derived. Simple differentiation will yield the time rates of change $\dot{\tau}$, $\dot{\omega}_s$ and thus $\dot{p}$ which may be used to provide additional control signals as required by a prime mover controller.

It is an established fact that a machine member, in this case a shaft, when subjected to torque loading will deflect angularly in direct proportion to the applied load within a specified elastic region of shaft distortion. The length of shaft over which this deflection occurs is related to the total angular deflection. In the case of a solid and homogeneous circular shaft, this angular deflection is predicted by $$d\phi = (\tau L/JG)$$

J—Polar moment of inertia
G—Young's modulus in torsion
$\phi$—Angular distortion of shaft over a length L
$\tau$—Torque loading This system is based upon the principle of detecting linear elastic angular distortion of a shaft under load. The means by which this is accomplished, is that two highly collimated or coherent light beams are projected onto the shaft at two locations separated by some linear distance, L, along the shaft. The use of monochromatic coherent sources simplifies the matching of source/detector characteristics as well as offering high radiant power densities (>25 mW/cm$^2$). The projected beams are incident upon and reflected from mirrors mounted tangentially to the shaft. As the angle of incidence is fixed relative to the shaft being observed, the reflected beams will scan an angle of $$\theta \text{ scan} = 2\tan^{-1}\frac{l}{2r}$$

(FIG. 13) where l is the length of the reflective tangents and r the shaft radius. Assuming that the shaft is rotating at some angular speed $\omega_s$, any perpendicular drawn to the tangent plane is also revolving at the same rate of speed, it follows that the reflected beams will scan an angle of $\theta_{scan}$ at the same rate.

Figure 15:
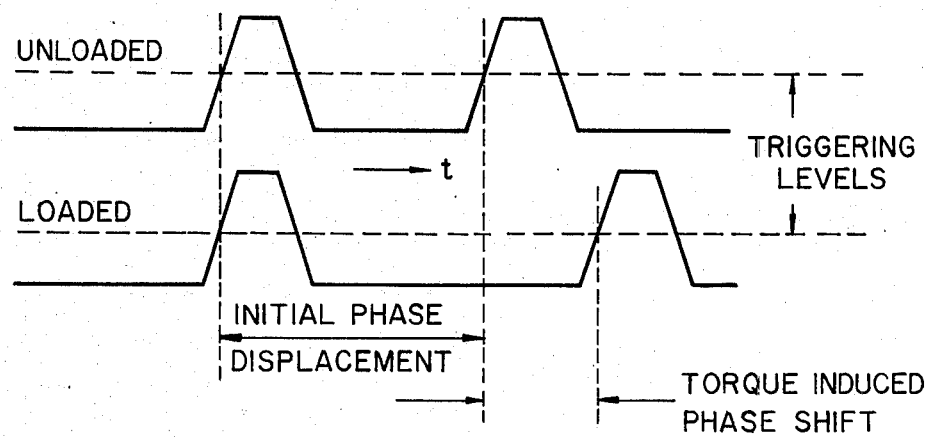
FIG. 15 is a wave form graph illustrating relative positions of the waves respectively for an unloaded and a loaded shaft.

By positioning two photodetectors within each $\theta_{scan}$ region, i.e. for respective mirrors A & B, the detectors will receive illumination once per shaft revolution. As the shaft is loaded, in addition to an initial phase difference between photodetector outputs, an additional torque induced phase shift is introduced (FIG. 15). Using a high frequency reference oscillator clocking high speed counters, the torque induced phase shift between detectors may be measured. The shaft speed is directly monitored by observing either of the detector outputs and referencing to some lower speed oscillator and counter. The measured phase shift between detector outputs at a known shaft speed corresponds to a net angular displacement (ds) between reflective tangents. This measure of displacement between tangents provides a relative measure of torque loading which may be used to generate an absolute torque.

The reflected beams will scan the detector surfaces at a speed which is closely approximated by the relation $$V_{scan} = \theta_{scan} d$$

where d is the distance separating the reflecting tangent from the detector. As the beam becomes incident upon the detector, the detector output will rise at a rate proportional to $V_{scan}$ unless the detector response is optimized as will be discussed.

Figure 16:
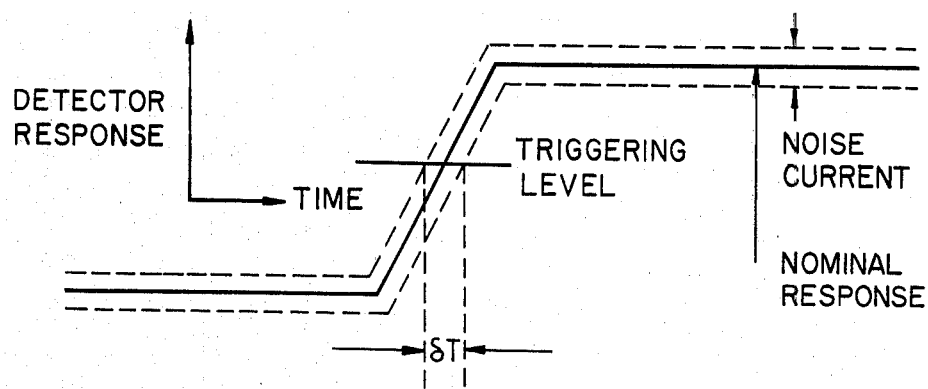
FIG. 16 is a graph illustrating characteristics of a particular photo-diode wherein the response thereof is plotted vs time.

Optron (OP905) silicon photodiodes are the detectors for which the following analysis is performed although a wide variety of detectors are quite suitable for this application. The response of the photodetectors is plotted versus time (FIG. 16). The RMS noise current generated internally within the diode is responsible for creating the δt uncertainty window which constitutes the time resolution limit of the detectors and thus, the uncertainty in triggering times of the comparators observing the detector outputs.

Responsivity of a photodetector is a measure of the photocurrent to the radiant flux producing it and has units of Amperes per watt (A/W). Responsivity of the detectors is predicted by the relation $$R_\phi = n_q \frac{\lambda}{1240}$$

where $n_q$ is the quantum efficiency in electrons per photon and $\lambda$ is the wavelength in nanometers. For the OP905 diode the responsivity at 900 nm is 0.49 A/W. The radiant source used in construction of the test system was a 0.5 mW He-Ne laser of wavelength $\lambda_L = 632.8$ nm. The responsivity of the diodes being correspondingly reduced to 0.392 A/W.

Noise equivalent power (NEP) is a measure of the radiant flux at a specified wavelength required to generate a unity signal to noise ratio normalized to bandwidth and is given by $$NEP = \frac{I_n / \sqrt{\Delta f}}{R_\phi}$$

where $I_n \sqrt{\Delta f}$ is the bandwidth normalized shot noise. The NEP figure of the OP905 diode illuminated with $\lambda_L = 632.8$ nm radiant flux is $5.0 \times 10^{-14}$ W/$\sqrt{Hz}$.

The product $NEP \times R_\phi$ yields a bandwidth normalized noise current equal in magnitude to $1.96 \times 10^{-14}$ A/$\sqrt{Hz}$. If the response slope is assumed to be linear with a $200 \times 10^{-9}$ sec turn-on time and at an incident power density of 25 mW/cm², the response of the diode will grow at the rate of 1250 A/sec. Using comparator devices having bandwidths of 10 MHz to trim detector outputs, an RMS noise current of $1.96 \times 10^{-14} \times (10 \times 10^6)^{\frac{1}{2}} = 6.20 \times 10^{-11}$ amps is derived. Thus, the δt uncertainty window per detector may be specified as $(2 \times 6.20 \times 10^{-11})/1250 = 9.92 \times 10^{-14}$ sec. The uncertainty in triggering times for two diodes is twice this figure and implies a total uncertainty of 0.20 ps.

Figure 13:
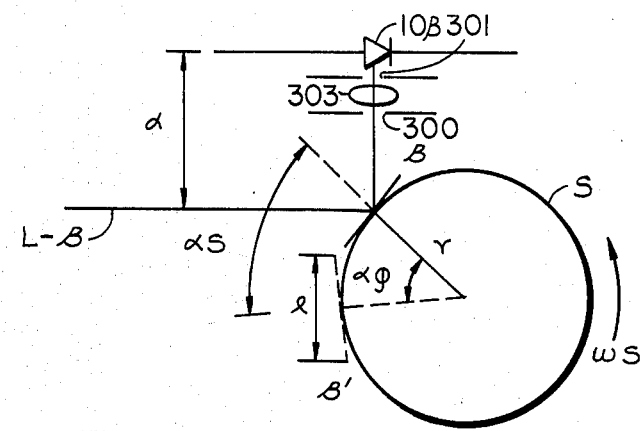
FIG. 13 is similar to FIG. 2b but illustrating a modification to the system incorporating means controlling the reflected beams.
Figure 14:
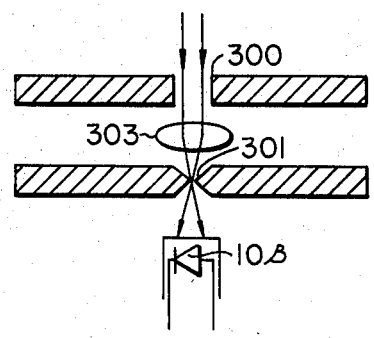
FIG. 14 is a diagrammatic enlarged view of the modification illustrated in FIG. 13.

The uncertainty figure derived for this system assumes instantaneous illumination of the detectors. It is clear that this condition is not satisfied by scanning diodes of a fixed physical size at a finite rate of speed. By having the beam of light pass through apertures 300 and 301 (see FIGS. 13 and 14), the real illumination time of the diode is reduced by the ratio of the beam diameter to the diameter of aperture 301. A lens 303 disposed between the apertures focuses the incident beam to its focal point and then diverges symmetrically as shown onto detector 10B. The use of a monochromatic coherent source will guarantee a discrete focal point of minimized size. By varying the distance of the detector element from aperture 301 the power density of the incident beam may be adjusted to optimize the diode response while maintaining the effectively increased scan speed. If a slit is used rather than a circular aperture, the sensitivity of a system to extraneous mechanical oscillation is greatly reduced. In FIG. 13, mirror B is illustrated in a position for an unloaded shaft and assumes position B' due to angular twist in the shaft when the latter is loaded. Light beam L-B is directed toward the reflective surface for reflection onto the detector 10B, passing first through aperture 300, then through a lens 303 and then a second aperture 301.

A shaft speed of 30 cps or 188.5 Rad sec$^{-1}$, and a distance d=200 mm separating the detector from the mirror yields a scan speed of $188.5 \times 200 = 37.7 \times 10^{-4}$ mm/sec. A second aperture (aperture 301) width of $7.54 \times 10^{-3}$ mm will provide a diode exposure time of 0.20 μs and the calculated uncertainty time (δT) of 0.20 ps will apply. A shaft diameter of 10 cm at 30 cps implies a surface speed of 942.8 cm sec$^{-1}$ and yields a limiting deflection resolution of $1.88 \times 10^{-10}$ cm.

It is apparent that the system response thus optimized, would require a reference oscillator of a frequency greater than 5.26 GHz to register a count at this deflection.

The inherent accuracy of this system is derived from the fact that the diode is not limited by its detectivity or sensitivity to a change in incident energy levels but, rather, by its frequency response. The diode is excited by a very rapid "optical arm" having a high radiant power density. If the diode response is much faster than the effective scan speed, then the scan speed is the limiting factor in the δT uncertainty calculations.

Figure 17A:
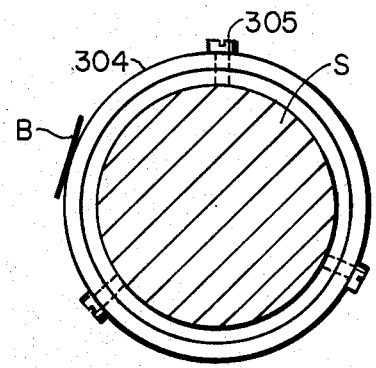
FIGS. 17a and 17b are respectively end and side views of a shaft illustrating a modified means of mounting the mirrors thereon.
Figure 17B:
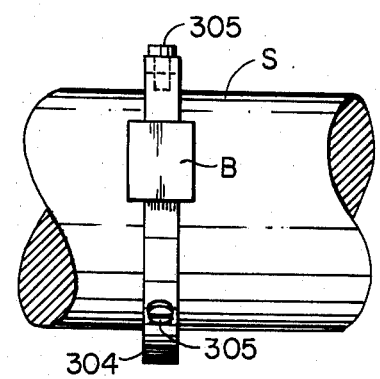

Due to the inherently high accuracy of this system, very little shaft length (L) is required for the high precision detection of shaft deflection. Since the reflective tangents affixed to the shaft are of a finite size, it follows that they also will distort in direct proportion to the torque load on the shaft. A shaft length of approximately six inches will ensure that the deflection of the shaft is of a magnitude sufficient to minimize errors introduced by flexure of the tangent surfaces. By mounting the reflective surfaces, i.e. mirrors A & B on respective ones of a pair of collars 304 (see FIG. 17) contacting the shaft and having minimized area contact, tangent flexure may be effectively eliminated. In FIG. 17 mirror B is illustrated mounted on a collar 304 which is anchored to shafts by set screws 305.

Figure 18:
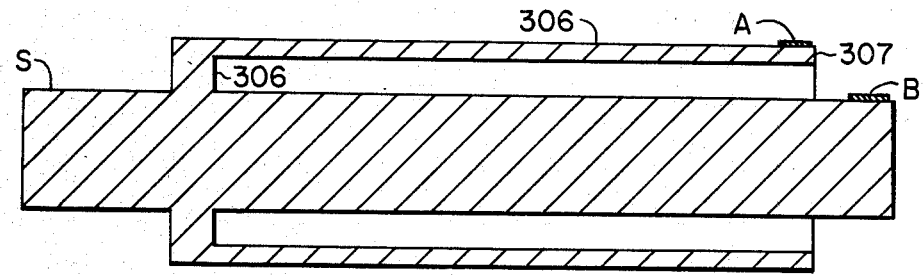
FIG. 18 is a sectional view along a length of a shaft illustrating a still further modified means for mounting the mirrors on the shaft.

The required shaft length occupied by the system can be reduced by the arrangement illustrated in FIG. 18 wherein a sleeve 306 is affixed to the remote distance, i.e. as at 307, on the shaft and has an opposite end free to move. The torque loading is detected using mirrors A & B disposed closely adjacent one another as illustrated.

The static calibration of the shaft may be achieved as follows. With reference to FIGS. 10 and 11, a singular laser or light beam, is provided which is subsequently split into two components at beam splitter 202 (see FIG. 10). The two light beam components are designated respectively as L-A and L-B. By providing the means by which the beams L-A and L-B are scanned across the mirrors in phase, the shaft may be torsionally loaded in a static manner and thus the system may be calibrated to output the known applied torque in a traceable manner. FIG. 19 illustrates how this method of calibration may be effected and referring to the same, mirror 308 is arranged to intercept the singular and primary light beam shown in FIGS. 10 and 11. Mirror 308 may be shaken or modulated in vertical position relative to mirror 309 which is fixed relative to the beam splitter 202 (FIG. 10). By modulating the vertical position of mirror 308, the vertical position of the primary beam is also modulated. Since the beams L-A and L-B are derived from the primary beam, they also are modulated in position and in phase. By arranging the beams to scan the mirrors while the shaft is torsionally loaded statically, the induced phase shift is proportional to the time applied torque. The means by which mirror 308 is positionally modulated are well known to those skilled in the art and may comprise an acoustic driver or shaker motor 310 shown in FIG. 19.

I claim:

1. Apparatus for measuring torque (or functions derived therefrom or related thereto) transmitted by a shaft driven to rotate and connected to a load comprising:
   (a) first and second optically flat, radiation reflecting, surfaces located on the shaft at respective first and second positions displaced from one another axially along the shaft;
   (b) means for directing beams of radiation from a suitable source at the reflecting surfaces;
   (c) first and second pickup means spaced from the shaft and located to receive the radiation beams reflected by the respective first and second reflecting surfaces during rotation of the shaft and provide respective first and second outputs as a result of the radiation beams directed thereat by the reflecting surfaces;
   (d) signal processing circuit means associated with said first and second outputs providing an output interrelated with angular twist of the shaft at one of said first and second positions relative to the other, and
   (e) at least one aperture between at least one said first and second reflecting surfaces and the pickup means associated therewith through which the reflected beam passes prior to striking the pickup means.

2. The apparatus of claim 1 including means operatively associated with the output of said signal processing circuit means providing a direct reading of measurements obtained.

3. The apparatus of claim 1 wherein said energy radiation source means comprises a collimated light source.

4. The apparatus of claim 1 wherein said radiation source means comprises a laser.

5. The apparatus of claim 1 wherein said pickup means comprise photo diodes.

6. The apparatus of claim 1 wherein said pickup means are two photo diodes actuated by reflected radiation and having outputs connected to a Flip-Flop, said Flip-Flop having an output pulse time that is directly proportional to shaft twist.

7. The apparatus of claim 1 wherein said first and second reflecting surfaces are co-linear and co-planar at a shaft no-load condition.

8. The apparatus of claim 1 including two spaced apart apertures in the path of the reflected beam.

9. The apparatus of claim 8 including a focusing lens in the path of the reflected light beam and disposed between said apertures.

10. The apparatus of claim 1 wherein said aperture is circular.

11. The apparatus of claim 1 wherein said aperture is a slit.

12. The apparatus of claim 1 wherein said aperture is located in the path of the reflected beam displaced by angular twist of the shaft relative to the other beams.

13. The apparatus of claim 1 including a collar secured to the shaft and wherein one of said reflecting surfaces is mounted on said collar.

14. The apparatus of claim 13 wherein said collar is secured to the shaft by means contacting the latter along only a short minor length axially along the shaft.

15. Apparatus for measuring torque (or functions derived therefrom or related thereto) transmitted by a shaft driven to rotate and connected to a load comprising:
   (a) first and second optically flat, radiation reflecting, surfaces located on the shaft at respective first and second positions displaced from one another axially along the shaft;
   (b) means for directing beams of radiation from a suitable source at the reflecting surfaces;
   (c) first and second pickup means spaced from the shaft and located to receive the radiation beams reflected by the respective first and second reflecting surfaces during rotation of the shaft and provide respective first and second outputs as a result of the radiation beams directed thereat by the reflecting surfaces; and
   (d) signal processing circuit means associated with said first and second outputs providing an output interrelated with angular twist of the shaft at one of said first and second positions relative to the other, said beam directing means, pickup means and signal processing circuit means being located in a casing and including a shock absorbing mounting means for said casing.

16. The apparatus of claim 15 including a laser mounted in said casing.

17. The apparatus of claim 16 wherein said beam directing means comprises a beam splitter and reflector and a beam reflector.

18. The apparatus of claim 17 wherein each of the beam splitter and reflector, and beam reflector are mounted by positionally adjustable gymbals.

19. Apparatus for measuring torque (or functions derived therefrom or related thereto) transmitted by a shaft driven to rotate and connected to a load comprising:
   (a) first and second optically flat, radiation reflecting, surfaces located on the shaft at respective first and second positions displaced from one another axially along the shaft;

(b) means for directing beams of radiation from a suitable source at the reflecting surfaces;

(c) first and second pickup means spaced from the shaft and located to receive the radiation beams reflected by the respective first and second reflecting surfaces during rotation of the shaft and provide respective first and second outputs as a result of the radiation beams directed thereat by the reflecting surfaces;

(d) signal processing circuit means associated with said first and second outputs providing an output interrelated with angular twist of the shaft at one of said first and second positions relative to the other, and (e) a separate aperture in the path of each of the reflected beams of radiation.

* * * * *